Patented July 24, 1934

1,967,772

UNITED STATES PATENT OFFICE 1,967,772

1 - ALKYLAMINO - 4 - ARYLAMINOANTHRA - QUINONES AND PROCESS OF MAKING SUCH PRODUCTS

Paul Grossmann, Basel, Switzerland, assignor to Society of Chemical Industry in Basle, Basel, Switzerland, a Swiss firm No Drawing. Application September 18, 1933, Serial No. 690,033. In Switzerland September 20, 1932

17 Claims. (Cl. 260—60)

The present invention relates to a new process for the production of 1-alkylamino-4-arylaminoanthraquinones, and it comprises the process of making these products, some of these products themselves, as well as their application in dyeing, particularly for dyeing cellulose esters and ethers, such as, for example, acetate artificial silk.

The new process for the production of the 1-alkylamino-4-arylaminoanthraquinones consists in causing primary arylamines and primary alkylamines to react on leuco-1:4-dihydroxyanthraquinones, or on 1:4-dihydroxyanthraquinones in presence of suitable reducing agents, or on mixtures of 1:4-hydroxyanthraquinones and leuco-1:4-dihydroxyanthraquinones, and converting the products thus obtained by treatment with oxidizing agents into true anthraquinone derivatives. This reaction may be carried out by causing the arylamines and the alkylamines to react on the leuco-1:4-dihydroxyanthraquinone in succession, or also by causing the two amines to react on the leuco-1:4-dihydroxyanthraquinone simultaneously.

The reaction may further be performed in presence of condensing agents, such as boric acid.

As regards the oxidizing operation, the same may be conducted by treating the isolated condensation products with suitable oxidizing agents. Such a treatment, for example, is the treatment of the obtained leuco-condensation product dissolved in sulfuric acid with manganese peroxide. It is however advisable to combine the oxidation with the condensation, or with the second phase of the condensation in a single operation, for example, by working in an open vessel, whereby the leuco condensation product which has primarily been formed is converted by the oxygen of the air into the true anthraquinone derivative. To the condensation mass there may also be added oxidizing agents, such as arsenic acid or alkali chlorates, whereby the leuco derivatives of the condensation products which have primarily been formed are also converted into anthraquinone derivatives.

The products thus obtained may, if necessary, be subjected to a purification process, for example, by crystallizing or dissolving the product in a suitable solvent and reprecipitating it. If condensation products have been obtained whose basicity is such that they are soluble in dilute mineral acids, they are best purified by dissolution in a dilute acid and precipitation with alkali.

As suitable starting materials for the present process the leuco derivatives of the following compounds, which are to be regarded as 1:4-dihydroxyanthraquinones, may be mentioned:—

Quinizarin, 1,4,5,8-tetrahydroxyanthraquinone, 1,4,5-trihydroxyanthraquinone, 1,4-dihydroxy-2,3-dichloranthraquinone, and the substitution products of these compounds.

Among the primary arylamines there may be named aniline, the toluidines, the aminophenols and the alkyl ethers thereof, the phenylenediamines, such as para-phenylenediamine or para-aminodimethylaniline; the toluylenediamines, the chloranilines, the chlortoluidines, the α- or the β-naphthylamine, etc. For carrying out the present process the primary amines of the general formula

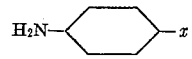

wherein $x$ stands for an OH- or NH$_2$-group, are particularly suitable.

Among the primary alkylamines there may be named methylamine, ethylamine, propylamine, butylamine, amylamine, etc.; further derivatives of these amines, such as β-hydroxyethylamine, hydroxypropylamine, etc.

Among the 1-alkylamino-4-arylaminoanthraquinones obtainable according to the present process the 1-hydroxyalkylamino-4-arylaminoanthraquinones corresponding to the general formula

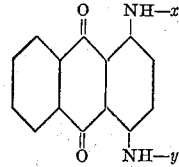

wherein $x$ stands for an hydroxyalkyl radical and $y$ for an aryl radical, are particularly valuable for the dyeing of the most various materials. They are inter alia capable of dyeing the fiber, for example wool, silk or acetate artificial silk, in an aqueous medium valuable greenish blue to green tints of very good properties of fastness. If these products contain sulfo groups, they are valuable acid dyestuffs; if they are unsulfonated, they are valuable acetate artificial silk dyestuffs. All these products form dark powders which dissolve in water or dilute aqueous alkali solutions or in acetic acid ethyl ester to blue to green solutions.

With regard to the dyeing of acetate artificial silk it may be remarked that already a certain number of aminoanthraquinone derivatives which dye this fiber green tints, have been described. If however the dyeing capacity of these compounds is examined it is found that whilst indeed they dye acetate artificial silk green, the dyeings are so weak that the compounds have not entered into the industry.

For the production of products destined for the dyeing of acetate artificial silk it may in certain cases be advisable to use mixtures consisting of two or more arylamines or two or more alkylamines, instead of starting from a definite primary arylamine and a definite primary alkylamine. The mixtures thus formed are distinguished over the pure products by a noticeably increased affinity for acetate artificial silk. Compositions of matter which have the same composition and the same valuable affinity for acetate artificial silk are also obtained by mixing the finished products with one another. Such a composition of matter is for example a mixture of the two products corresponding to the following formulas:—

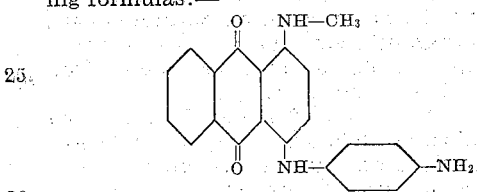

and

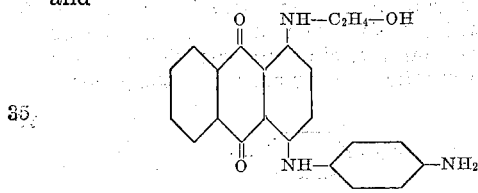

The new blue to green dyeing 1-alkylamino-4-arylaminoanthraquinones of the general formula wherein $x$ and $y$ have the already indicated signification, may now not only be made according to the above described process but also in the following manner:—

By causing a primary hydroxyalkylamine to react with a compound of the general formula in which $y$ has the meaning already indicated and $z$ represents an atom or group capable of being exchanged, such as OH, OR (R=alkyl or phenyl), NO₂ or halogen, or in causing an aromatic amine to react with a compound of the general formula in which $x$ and $z$ have the meanings already indicated, or in causing a 1-amino-4-arylidoanthraquinone to react with ethylene-oxide or a homologue or analogue thereof, such as propylene-oxide or glycide.

It has also been found that the dyestuffs can also be made by condensation of a leuco-1:4-di-(arylamino)-anthraquinone with an hydroxyalkylamine or of a leuco-1:4-di-(hydroxyalkylamino)-anthraquinone with an arylamine, or by condensation of a leuco-1:4-diaminoanthraquinone with an hydroxyalkylamine and an arylamine. In each case the oxidation of the condensation product to the dyestuff may be conducted during or after the condensation. The amines are advantageously used in molecular quantities or in a small excess, if required in the presence of a condensing agent. It is also possible to operate with quantities of the amines larger than the molecular quantities if care is taken, by the choice of suitable reaction conditions, that the reaction leads to unsymmetrical compounds and not to symmetrical compounds.

A further procedure for making the new dyestuffs consists in condensing a leuco-1-hydroxy-4-arylaminoanthraquinone with an hydroxyalkylamine or a leuco-1-hydroxy-4-hydroxyalkylamino-anthraquinone with an aromatic amine and oxidizing the condensation product during or after the condensation.

The dyestuffs obtainable in accordance with the invention, all of which contain an hydroxyalkylamino-group in para-position to an arylamino-group, are distinguished from the known 1-alkylamino-4-arylamino-anthraquinones by an appreciably greater affinity for acetate artificial silk fibers, which they dye in very valuable blue to green shades. The new dyestuffs can be sulfonated very easily, the sulfonated dyestuffs constituting valuable acid wool dyestuffs.

The following examples illustrate the invention, the parts being by weight:—

*Example 1*

9 parts of leuco-quinizarin, 9 parts of quinizarin, 6 parts of β-hydroxyethylamine and 10.5 parts of para-phenylenediamine in 90 parts of ethyl alcohol are heated to boiling for 24 hours. The whole is filtered cold, washed with alcohol and water, and the filter residue heated with 400 parts of hydrochloric acid of 7 per cent. strength, filtered again and washed with hot water. The 1-β-hydroxyethylamino-4-(4'-amino)-phenylaminoanthraquinone of the formula

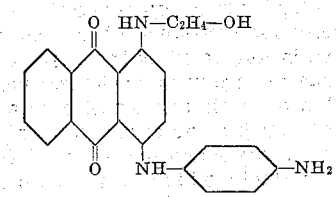

thus formed is present in the filtrate, and may be precipitated therefrom by neutralization with milk of lime or sodium carbonate in the cold. By pouring the solution on ice and alkali and grinding with suitable additions, the dyestuff is brought into a form suitable for dyeing acetate artificial silk. It dyes this fiber in pure green tints of good fastness properties.

*Example 2*

12 parts of leuco-quinizarin, 6 parts of paraphenylenediamine, 6.8 parts of a solution of methylamine in ethyl alcohol of 24 per cent.

strength, 1.4 parts of sodium chlorate, and 4 parts of dried boric acid in 80 parts of ethyl alcohol are heated in an enamelled autoclave for about 20 hours at 90° C. The whole is filtered cold, washed with ethyl alcohol and water, whereupon the 1-methyl-amino-4-para-phenylene-diaminoanthraquinone of the formula

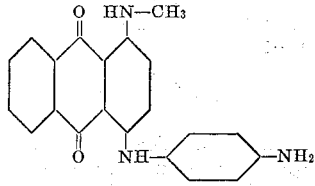

is obtained in good yield. The product dissolves in acetic acid ethyl ester to a blue-green and in concentrated sulfuric acid to a violet-blue solution. The reaction proceeds similarly with para-aminophenol, meta-phenylenediamine, para-toluylenediamine etc. instead of with para-phenylenediamine, and with ethylamine, propylamine etc., instead of with methylamine.

Example 3

9 parts of leuco-quinizarin, 9 parts of quinizarin, 4 parts of β-hydroxyethylamine, 3 parts of methylamine of 27 per cent. strength, and 10 parts of para-phenylenediamine in 90 parts of ethyl alcohol are heated to boiling for about 24 hours. The product is worked up in similar manner as indicated in Example 1, a dyestuff being obtained which dyes acetate artificial silk, after having been brought into the form of a paste in a suitable manner, very powerful green shades.

Example 4

240 parts of leuco-quinizarin and 110 parts of para-phenylenediamine in 1000 parts of ethyl alcohol are heated in an autoclave for about 22 hours at 90° C. The whole is filtered cold and there is obtained in excellent yield the leuco-1-hydroxy-4-para-phenylenediaminoanthraquinone. The reaction may also be conducted in an aqueous solution. If the time of the reaction is extended, the operation may also be performed in an open vessel. 264 parts of this leuco-1-hydroxy-4-para-phenylenediaminoanthraquinone, 68 parts of β-hydroxyethylamine, 28 parts of sodium chlorate, and 80 parts of dried boric acid in 1400 parts of methyl alcohol are heated for about 20 hours at 65° C. The whole is filtered cold, washed with methyl alcohol and water, 1-β-hydroxy-ethylamino-4-para-phenylenediaminoanthraquinone of the formula

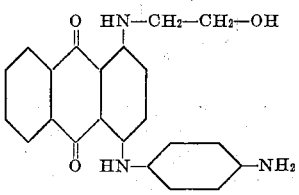

being obtained in good yield and purity. The product dissolves in acetic acid ethyl ester to blue-green, and in concentrated sulfuric acid to violet-blue solutions, which latter, on addition of formaldehyde, changes to green. When adding boric acid no immediate change of color takes place in the cold, but after allowing the solution to stand for a longer time, an intensively red fluorescence occurs. The recrystallized product melts at 225° C. After the product has been brought into the form of a paste in a suitable manner it dyes acetate artificial silk in powerful green tints.

Example 5

6 parts of leuco-quinizarin in the form of a fine paste, 1.8 parts of β-hydroxyethylamine and 3 parts of para-phenylene-diamine in a total of 30 parts of water are heated for about 15 hours on a boiling water bath. The leuco-product obtained is oxidized in usual manner, and purified as indicated in Example 1.

Example 6

50 parts of the product prepared according to Example 4 are dissolved in 200 parts of monohydrate, while cooling, so that the temperature does not exceed 20° C. As soon as a test portion is completely soluble in dilute alkalies the whole is poured into a mixture of ice and common salt, filtered and washed with an aqueous solution of common salt. The dyestuff is a sulfonic acid of the product of Example 1, the position of the $SO_3H$ group or groups is not known. It dissolves in water or dilute alkalies to blue-green, and in concentrated sulfuric acid to violet-blue solutions. It dyes wool in an acid bath green tints.

Example 7

63 parts of 1-β-hydroxyethylamino-4-methoxy-anthraquinone and 100 parts of para-phenylene-diamine are heated together in 250 parts of dimethylaniline for about 2 hours at 160–180° C. After cooling, 350 parts of methyl alcohol are added to the reaction mixture, whereby there is precipitated in excellent purity a product which, after having been brought into the form of a paste in a suitable manner, dyes acetate artificial silk in pure green shades.

The same product can be obtained by condensation of para-phenylene-diamine with 1-β-hydroxyethylamino-4-bromanthraquinone.

By sulfonating the product there is obtained a sulfonic acid whose alkali salts are soluble.

Example 8

50 parts of 1-amino-4-para-hydroxyphenylaminoanthraquinone and 400 parts of a solution of 20 per cent. strength of ethyleneoxide in glacial acetic acid are stirred together for several hours at 50–60° C. The solvent is then distilled. The residue is taken up with water and the 1-β-hydroxyethylamino-4-para-hydroxyphenyl-aminoanthraquinone is separated by filtration. After this product has been brought into the form of a paste in a suitable manner it dyes acetate artificial silk in powerful green-blue shades. If desired the reaction may be conducted with the aid of another diluent and under pressure.

Example 9

6 parts of leuco-1,4-di-(β-hydroxyethylamino)-anthraquinone, 2 parts of para-phenylenediamine and 1 part of para-phenylene-diamine hydrochloride in 30 parts of ethyl alcohol are heated to boiling for several hours. The condensation product is oxidized in the usual manner and purified according to Example 1 above. When brought into the form of a paste it dyes acetate artificial silk in powerful blue-green shades.

Example 10

6 parts of leuco-1,4-diaminoanthraquinone, 2.5 parts of para-aminophenol and 1.7 parts of β-hydroxyethylamine in 30 parts of ethyl alcohol are heated to boiling for several hours. The condensation product obtained after oxidation in the usual manner and converted into the form of a paste dyes acetate artificial silk in powerful green-blue shades.

The anthraquinone derivatives made as described in the foregoing examples may be used for dyeing acetate artificial silk according to the following prescription:—

15 parts of the anthraquinone derivative are stirred in known manner with sulfite cellulose waste liquor or with a sulfonation product of the residue of the distillation of benzaldehyde or turpentine oil to produce a homogeneous paste of 20 per cent. strength.

5 parts of the paste thus prepared are stirred with about an equal quantity of a soap solution of 6 per cent. strength at about 50° C. and diluted to 300 parts by addition of luke warm water. 10 parts of acetate artificial silk are introduced into the bath thus prepared, the temperature is raised within ¾ hour to 75-80° C. and the material is handled for about ¾ hour at this temperature. It is then rinsed and dried. By this procedure the acetate artificial silk is dyed in beautiful fast shades.

What I claim is:—

1. Process for the manufacture of 1-alkylamino-4-arylamino-anthraquinones, consisting in causing primary aromatic amines of the benzene series and primary aliphatic amines to react on leuco-1,4-dihydroxyanthraquinones, and oxidizing the condensation products thus formed to anthraquinone derivatives.

2. Process for the manufacture of 1-alkylamino-4-arylamino-anthraquinones, consisting in causing first a primary aromatic amine of the benzene series, and then a primary aliphatic amine containing at the most 5 carbon atoms, to react on leuco-1,4-dihydroxyanthraquinones, and oxidizing the condensation products thus formed to anthraquinone derivatives.

3. Process for the manufacture of 1-alkylamino-4-arylamino-anthraquinones, consisting in causing first a primary aliphatic amine containing at the most 5 carbon atoms, and then a primary aromatic amine of the benzene series, to react on leuco-1,4-dihydroxyanthraquinones, and oxidizing the condensation products thus formed to anthraquinone derivatives.

4. Process for the manufacture of 1-alkylamino-4-arylamino-anthraquinones, consisting in causing a primary aromatic amine of the benzene series and a primary aliphatic amine containing at the most 5 carbon atoms, to react simultaneously on leuco-1,4-dihydroxyanthraquinones, and oxidizing the condensation products thus formed to anthraquinone derivatives.

5. Process for the manufacture of 1-alkylamino-4-arylamino-anthraquinones, consisting in causing first a primary aromatic amine of the benzene series, and then a primary aliphatic amine containing at the most 5 carbon atoms, to react on leuco-1,4-dihydroxyanthraquinones, the two condensations being performed in a single operation, and oxidizing the condensation products thus formed to anthraquinone derivatives.

6. Process for the manufacture of 1-alkylamino-4-arylamino-anthraquinones, consisting in causing first a primary aromatic amine of the general formula

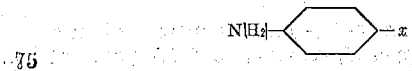

wherein $x$ stands for OH or NH$_2$, and then a primary aliphatic amine containing at the most 2 carbon atoms, to react on leuco-1:4-dihydroxyanthraquinones, and oxidizing the condensation products thus formed to anthraquinone derivatives.

7. Process for the manufacture of 1-alkylamino-4-arylamino-anthraquinones, consisting in causing first a primary aromatic amine of the general formula

wherein $x$ stands for OH or NH$_2$, and then a primary aliphatic amine containing at the most 2 carbon atoms, to react on leuco-1,4-dihydroxyanthraquinones, the two condensations being performed in a single operation, and oxidizing the condensation products thus formed to anthraquinone derivatives.

8. Process for the manufacture of 1-alkylamino-4-arylamino-anthraquinones, consisting in causing para-phenylenediamine and β-hydroxyethylamine to react on leuco-1,4-dihydroxyanthraquinones, the two condensations being performed in a single operation, and oxidizing the condensation products thus formed to anthraquinone derivatives.

9. Process for the manufacture of 1-alkylamino-4-arylamino-anthraquinones, consisting in causing para-phenylenediamine and methylamine to react simultaneously on leuco-1,4-dihydroxyanthraquinones, and oxidizing the condensation products thus formed to anthraquinone derivatives.

10. Process for the manufacture of 1-alkylamino-4-arylamino-anthraquinones, consisting in causing first para-phenylenediamine and then β-hydroxyethylamine to react on leuco-1,4-dihydroxyanthraquinones, and oxidizing the condensation products thus formed to anthraquinone derivatives.

11. Process for the manufacture of 1-alkylamino-4-arylamino-anthraquinones, consisting in causing first para-phenylenediamine and then methylamine to react on leuco-1,4-dihydroxyanthraquinones, the two condensations being performed in a single operation, and oxidizing the condensation products thus formed to anthraquinone derivatives.

12. The 1-alkylamino-4-arylaminoanthraquinones of the general formula

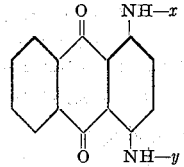

wherein $x$ stands for a hydroxyalkyl radical and $y$ for an aryl radical, which products form dark powders, dissolving in water or dilute aqueous alkali solutions or in acetic acid ethyl ester to blue to green solutions, and dyeing the fiber in aqueous baths blue to green tints.

13. The 1-alkylamino-4-arylaminoanthraquinones of the general formula

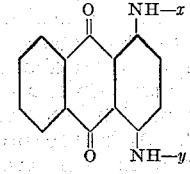

wherein $x$ stands for a hydroxyalkyl radical and $y$ for an aryl radical of the benzene series, which products form dark powders which are insoluble in water or dilute aqueous alkali solutions, but dissolve in acetic acid ethyl ester to blue to green solutions, and, when brought into fine dispersion, dye acetate artificial silk in aqueous suspensions fast blue to green tints.

14. The 1-alkylamino-4-arylaminoanthraquinones of the general formula

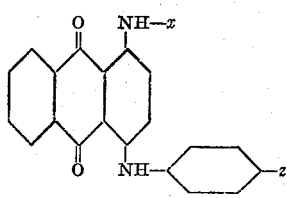

wherein $x$ stands for a hydroxyalkyl radical and $z$ for an $NH_2$- or $OH$-group, which products form dark powders which are insoluble in water or dilute aqueous alkali solutions, but dissolve in acetic acid ethyl ester to blue to green solutions, and, when brought into fine dispersion, dye acetate artificial silk in aqueous suspensions fast blue to green tints.

15. The 1-alkylamino-4-arylaminoanthraquinones of the general formula

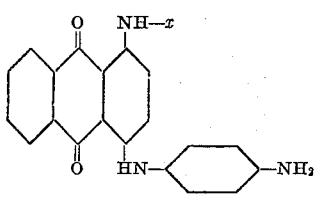

wherein $x$ stands for a hydroxyalkyl radical, which products form dark powders which are insoluble in water or dilute aqueous alkali solutions, but dissolve in acetic acid ethyl ester to green solutions, and, when brought into fine dispersion, dye acetate artificial silk in aqueous suspensions fast green tints.

16. The 1-alkylamino-4-arylaminoanthraquinone of the formula

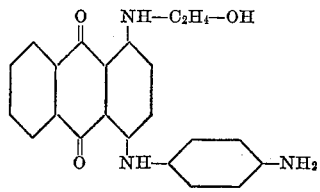

which product forms a dark powder which is insoluble in water or dilute aqueous alkali solutions but dissolves in acetic acid ethyl ester to a blue-green solution, and, when brought into fine dispersion, dyes acetate artificial silk in aqueous suspension fast green tints.

17. The sulfonic acids of the 1-alkylamino-4-arylaminoanthraquinones of the general formula

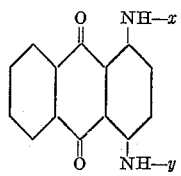

wherein $x$ stands for a hydroxyalkyl radical and $y$ for an aryl radical, which products form dark powders, dissolving in water or dilute aqueous alkali solutions to blue to green solutions and dyeing wool in aqueous baths fast blue to green tints.

PAUL GROSSMANN.